(12) United States Patent
Todoroki

(10) Patent No.: US 8,681,272 B2
(45) Date of Patent: Mar. 25, 2014

(54) DIGITAL BROADCAST RECEIVER

(75) Inventor: Yoshio Todoroki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/818,199

(22) PCT Filed: Oct. 22, 2010

(86) PCT No.: PCT/JP2010/006263
§ 371 (c)(1),
(2), (4) Date: Feb. 21, 2013

(87) PCT Pub. No.: WO2012/053039
PCT Pub. Date: Apr. 26, 2012

(65) Prior Publication Data
US 2013/0155326 A1   Jun. 20, 2013

(51) Int. Cl.
*H04N 5/445* (2011.01)
*H04N 5/45* (2011.01)

(52) U.S. Cl.
CPC . *H04N 5/445* (2013.01); *H04N 5/45* (2013.01)
USPC .............................. 348/563; 348/565; 725/43

(58) Field of Classification Search
CPC ........... H04N 5/45; H04N 5/445; H04N 5/66; H04N 5/268; H04N 5/44582
USPC .............. 348/563–570, 705, 706; 725/37–61
See application file for complete search history.

(56) References Cited

U.S. PATENT DOCUMENTS 6,407,776 B1   6/2002 Sekimoto et al.
6,501,511 B2  12/2002 Sekimoto et al.
2002/0147976 A1 * 10/2002 Yuen et al. ....................... 725/40
2006/0143656 A1 *  6/2006 Sakamoto et al. .............. 725/47
2011/0170013 A1    7/2011 Todoroki et al.

FOREIGN PATENT DOCUMENTS

| JP | 3037041 B2 | 4/2000 |
| JP | 2000-253327 A | 9/2000 |
| JP | 2005-117226 A | 4/2005 |
| JP | 2007-43658 A | 2/2007 |
| JP | 2007-74384 A | 3/2007 |
| JP | 4372117 B2 | 11/2009 |
| WO | WO 2010/073428 A1 | 7/2010 |

* cited by examiner

*Primary Examiner* — Michael Lee

(74) *Attorney, Agent, or Firm* — Birch, Stewart, Kolasch & Birch, LLP

(57) ABSTRACT

A digital broadcast receiver includes: a plurality of broadcast receiving units that receive program images and broadcast information; an image selecting/combining unit that selectively combines program images as a main-screen and a sub-screen; a plurality of monitors that display program images; a control unit that includes an idle-state detecting unit for detecting the broadcast receiving unit of idle-state, an idle-state establishing unit for controlling the broadcast receiving unit to halt receiving broadcast waves and controlling the image selecting/combining unit to output the program image received by other broadcast receiving unit to a monitor as a main-screen when an instruction of receiving broadcast information is accepted and when there is no broadcast receiving unit of idle-state, and a broadcast information acquisition instructing unit that control the broadcast receiving unit of idle-state to acquire the broadcast information when the instruction of receiving broadcast information is accepted.

4 Claims, 14 Drawing Sheets

FIG.5
(a)
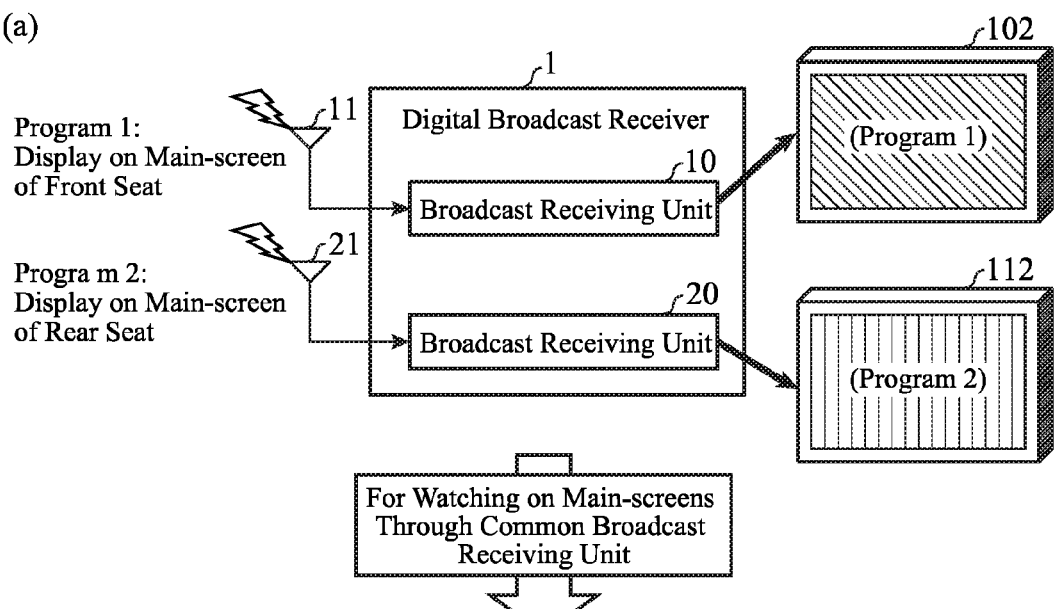
(b)
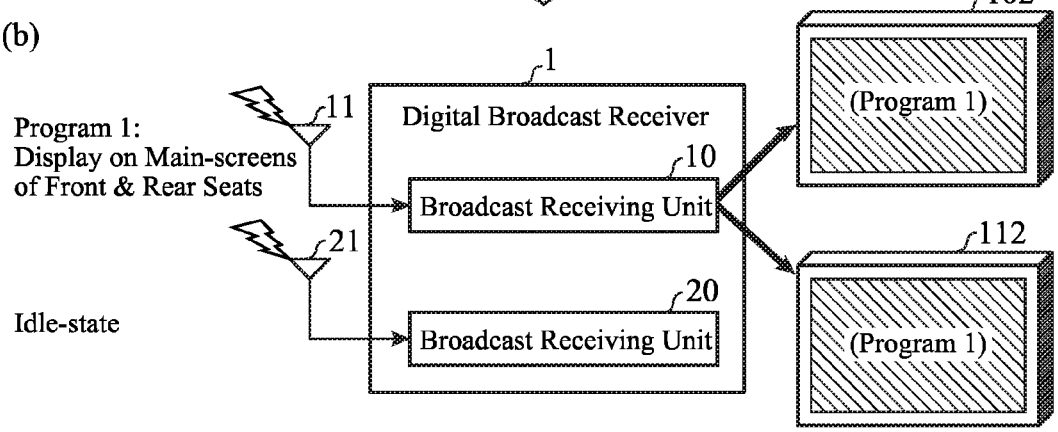

FIG.9
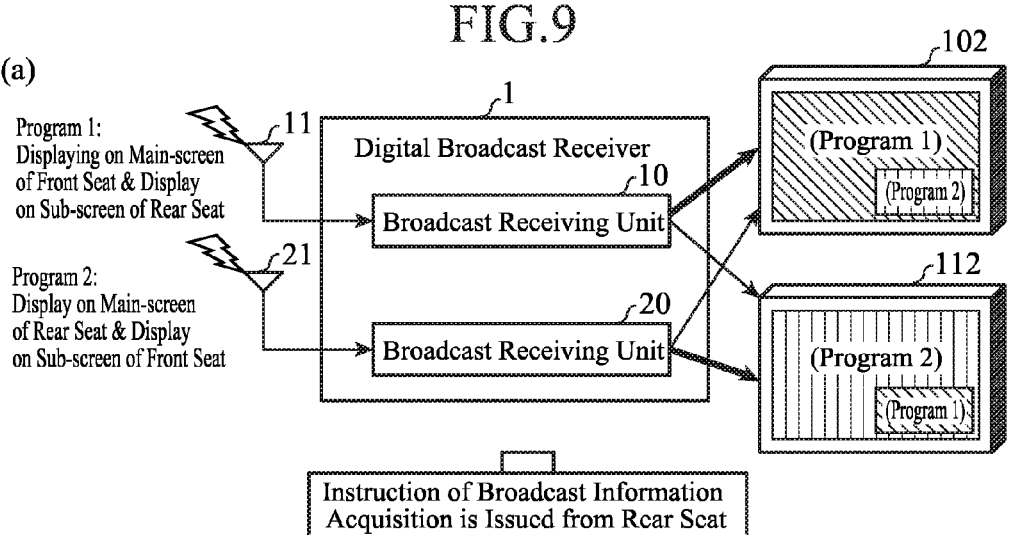
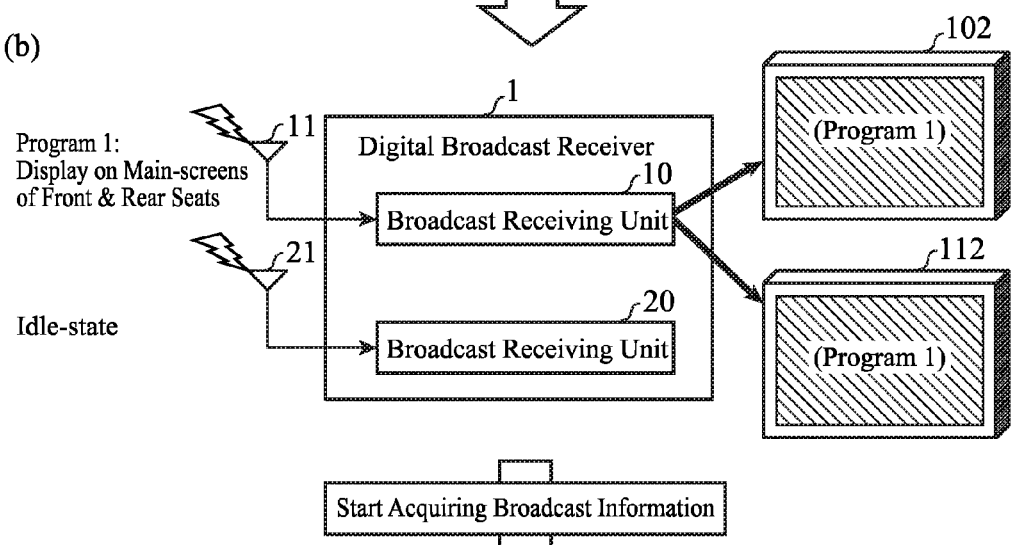
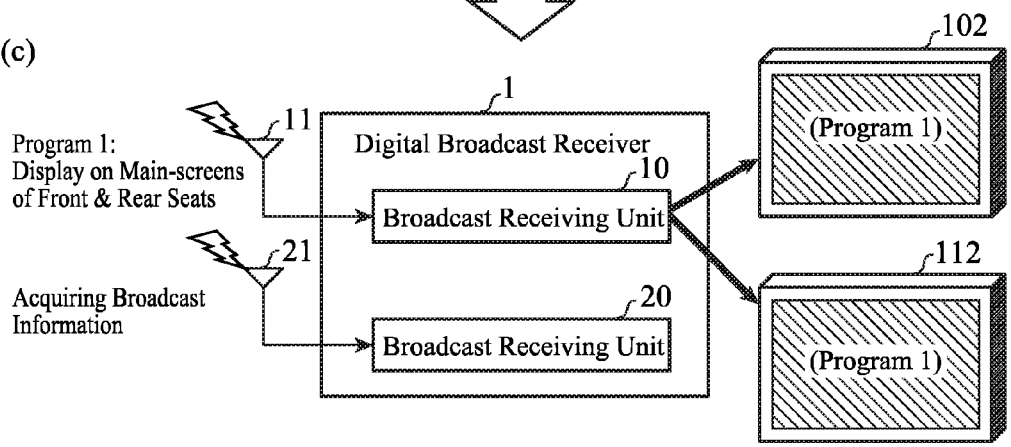

FIG.11
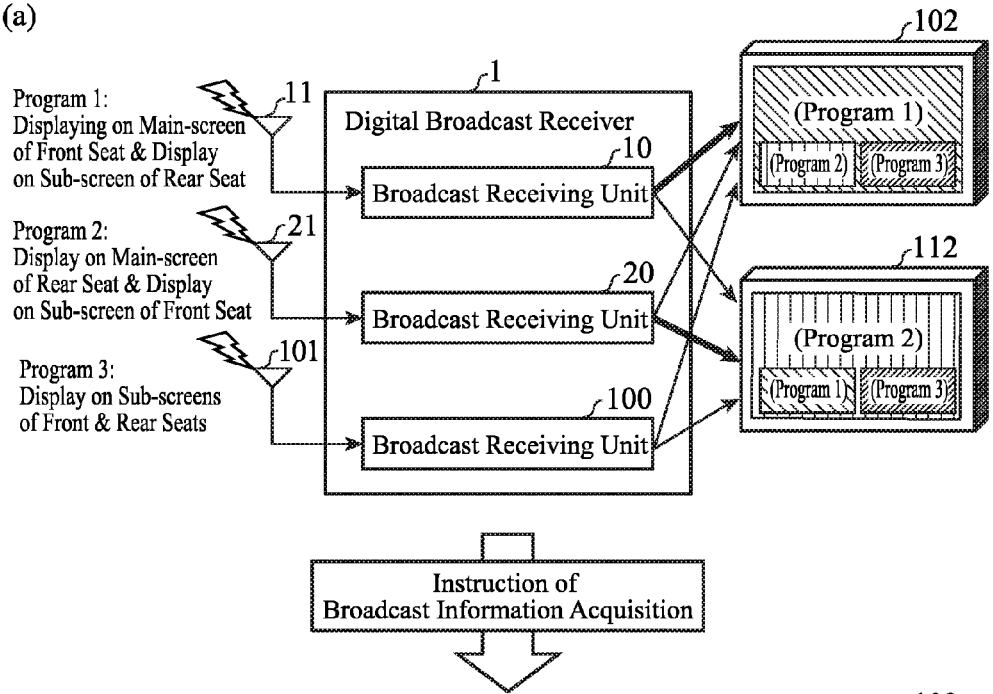
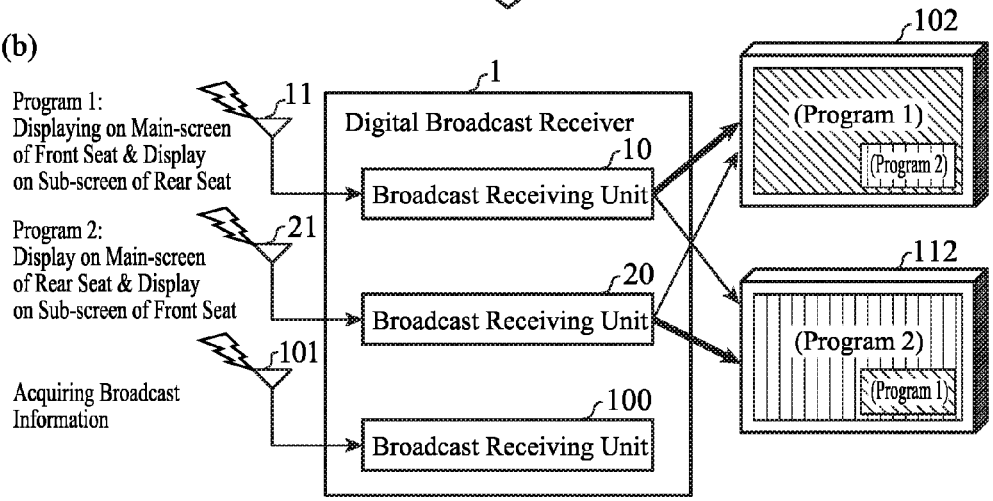

DIGITAL BROADCAST RECEIVER

TECHNICAL FIELD

This invention relates to a digital broadcast receiver having a sub-screen display function (PinP: Picture in Picture) and displaying program images selectively received by a plurality of broadcast receiving units on a plurality of monitors which can individually and selectively display the program images.

BACKGROUND ART

As a digital broadcast receiver having a plurality of broadcast receiving units, there is a broadcast receiver as shown in Patent Document 1, which is configured to achieve effective antenna utilization among a plurality of tuners. The broadcast receiver disclosed in Patent Document 1 is connected to a multi-view display device (or plural display devices), and changes a tuning state of its diversities/tuners in accordance with the tuning state.

Furthermore, there is a television receiver provided with a sub-screen display function as disclosed in Patent Document 2. The receiver disclosed in Patent Document 2 displays, while a program is being viewed, a plurality of sub-screens by sequentially receiving the other broadcasting programs through plural tuners and plural image processing units.

CITATION LIST

Patent Documents

Patent Document 1: Japanese Patent Application Laid-open No. 2007-43658
Patent Document 2: Japanese Patent No. 3037041

SUMMARY OF THE INVENTION

However, in the conventional digital broadcast receivers as disclosed in Patent Documents 1 and 2, when an instruction to acquire broadcast information of available programs for viewing is issued in a state that a program image from the broadcast receiving unit is being displayed on a monitor, the broadcast receiving unit is caused to halt receiving the program image and instead acquires the broadcast information. Therefore, no program image is displayed during acquiring the broadcast information by the broadcast receiving unit, and thereby a user is interrupted from viewing the program.

Furthermore, when an instruction to display a program list is issued in a state that a program image from the broadcast receiving unit is being displayed on a monitor, the program image displayed on the monitor is switched to the program list. Therefore, no program image is displayed during the display of the program list, and thereby a user is interrupted from viewing the program.

This invention has been made to solve the problems as described above, and an object thereof is to provide a digital broadcast receiver that is capable of performing various operations without interrupting a user from viewing a program by effectively utilizing a plurality of broadcast receiving units.

A digital broadcast receiver according to the invention includes: a plurality of broadcast receiving units configured to receive broadcast waves including images of programs and broadcast information about the programs; an image selecting/combining unit that includes an image allotter configured to allot the program images received by the respective broadcast receiving units, an image downsizer configured to perform a downsizing process on the program image allotted by the image allotter, and an image composer configured to combine at least one of the program images allotted by the image allotter as a main-screen with the program image downsized by the image downsizer as a sub-screen; a plurality of monitors configured to display the program images outputted from the image selecting/combining unit; a manipulation input unit configured to accept an instruction from a user to acquire broadcast information about viewable programs; and a control unit that includes an idle-state detecting unit configured to detect the broadcast receiving unit in a state of not receiving program image, an idle-state establishing unit configured to control the broadcast receiving unit corresponding to the monitor viewed by the user to halt receiving broadcast waves and control the image selecting/combining unit to output the program image as a main-screen to said monitor, when the instruction is accepted through the manipulation input unit and when the idle-state detecting unit determines that there is no broadcast receiving unit in a state of not receiving program image, and a broadcast information acquisition instructing unit configured to control the broadcast receiving unit in a state of not receiving program image to acquire the broadcast information, when the instruction is accepted through the manipulation input unit.

In another aspect, a digital broadcast receiver according to the invention includes: a plurality of broadcast receiving units configured to receive broadcast waves including images of programs and broadcast information about the programs; a broadcast information storing unit configured to store the broadcast information received by the respective broadcast receiving units; an image selecting/combining unit that includes an image allotter configured to allot the program images received by the respective broadcast receiving units, an image downsizer configured to perform a downsizing process on the program image allotted by the image allotter, and an image composer configured to combine at least one of the program images allotted by the image allotter as a main-screen with the program image downsized by the image downsizer as a sub-screen; a plurality of monitors configured to display the program images outputted from the image selecting/combining unit; a manipulation input unit configured to accept instructions from a user to display a program list and to select a program; and a control unit that includes a program list display instructing unit configured to control a given one of the monitors to display the program list based on the broadcast information stored in the broadcast information storing unit, when the instruction for displaying the program list is accepted through the manipulation input unit, and a program selection instructing unit configured to, when the instruction for selecting a program to be displayed as a main-screen or a sub-screen on the monitor other than the given monitor being displaying the program list is accepted through the manipulation input unit, control a given one of the broadcast receiving units to receive program image of the instructed program and control the image selecting/combining unit to output the program image received by the given broadcast receiving unit as a main-screen or sub-screen to the monitor other than the given monitor being displaying the program list.

According to the configuration described above, the present invention is capable of acquiring broadcast information, displaying a program list and selecting a program without interrupting a user from viewing a program by effectively utilizing plural broadcast receiver units.

BRIEF DESCRIPTION OF THE DRAWINGS

FIG. 5 is a schematic view illustrating the same-program display operation of the digital broadcast receiver according to Embodiment 1 of the present invention, in which the diagram (a) shows different main-screen displays on both monitors, and the diagram (b) shows the same main-screen display on both monitors, FIG. 9 is a schematic view illustrating the broadcast information acquiring operation of the digital broadcast receiver according to Embodiment 1 of the present invention, in which the diagram (a) shows main-screen and sub-screen displays on both monitors, the diagram (b) shows a reception-halted state of one of the broadcast receiving units, but the same main-screen display on both monitors, and the diagram (c) shows a broadcast information receiving state of the one of the broadcast receiving units, FIG. 11 is a schematic view illustrating the broadcast information acquiring operation of the digital broadcast receiver according to Embodiment 2 of the present invention, in which the diagram (a) shows main-screen and sub-screen displays on both monitors, and the diagram (b) shows a broadcast information receiving state of a broadcast receiving unit where a program selection has been carried out only for the sub-screen, FIG. 12 a block diagram showing a configuration of a control unit of a digital broadcast receiver according to Embodiment 3 of the present invention.

DESCRIPTION OF EMBODIMENTS

Figure 1:
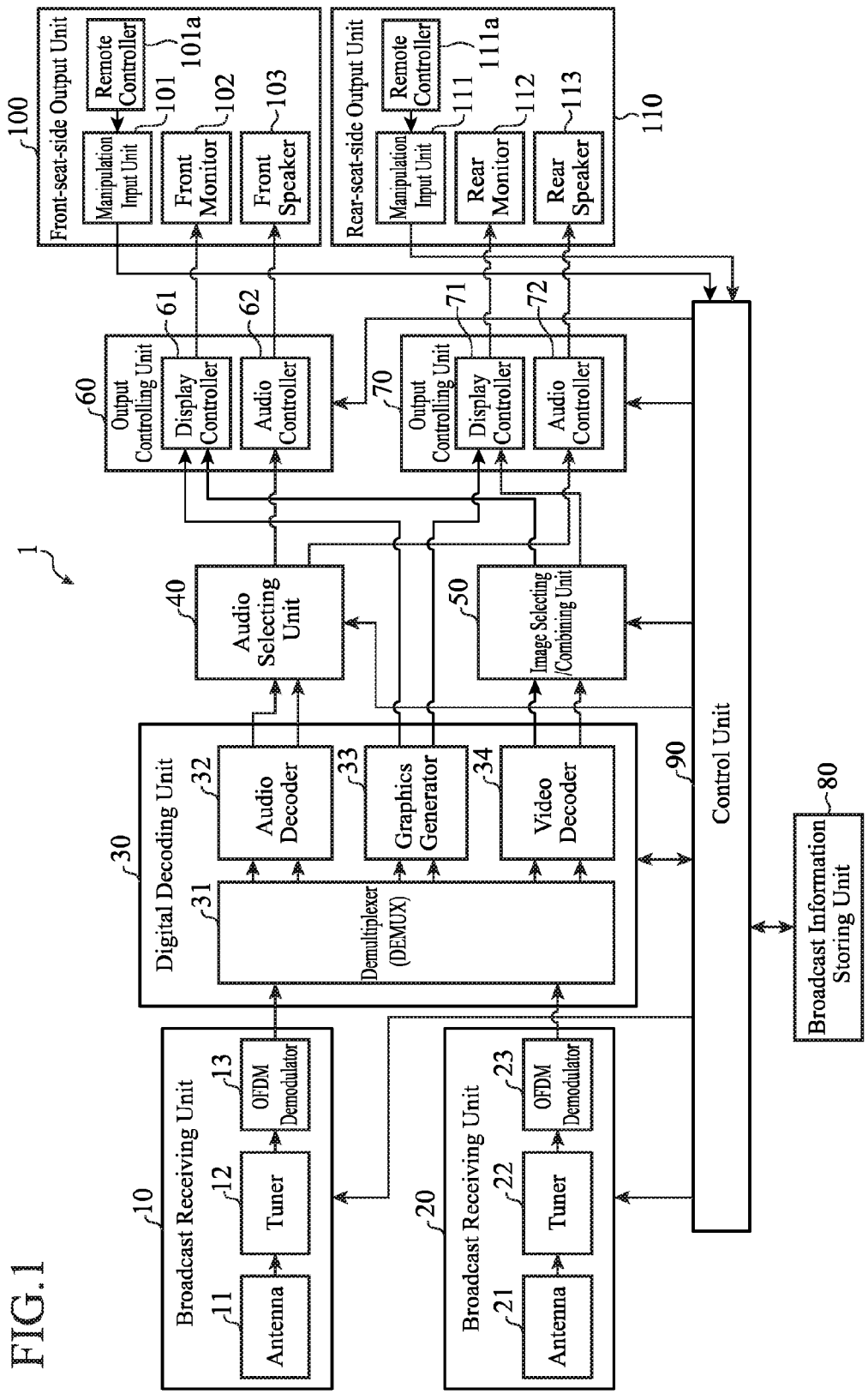
FIG. 1 is a block diagram showing a configuration of a digital broadcast receiver according to Embodiment 1 of the present invention.

Embodiments of the invention will be described in detail with referring to the drawings. It is noted that the following embodiments are presented on an assumption that each digital broadcast receiver is mounted in a vehicle.
Embodiment 1

As shown in FIG. 1, a digital broadcast receiver 1 is equipped with: broadcast receiving units 10 and 20 as a plurality of broadcast receiving units; a digital decoding unit 30; an audio selecting unit 40; an image selecting/combining unit 50; output controlling units 60 and 70; a broadcast information storing unit 80; a control unit 90; and output units 100 and 110 as a plurality of output units. This kind of configuration of the digital broadcast receiver 1 is similar to the configuration that the conventional digital broadcast receiver has.

The broadcast receiving units 10 and 20 have antennas 11 and 21, tuners 12 and 22, and OFDM (Orthogonal Frequency Division Multiplexing) demodulators 13 and 23, respectively.

The antennas 11 and 21 serve to receive, from among broadcast waves of digital terrestrial television transmitted through Channels 13 to 62 in UHF (Ultra High Frequency) region (hereinafter, "broadcast waves"), broadcast waves of desired channels (or broadcast programs) selected by the tuners 12 and 22, respectively.

The OFDM demodulators 13 and 23 serve to perform OFDM demodulation of the broadcast waves received by the antennas 11 and 21. The transport stream (hereinafter, "TS") generated through the OFDM demodulation by the OFDM demodulator 13 or 23 is packetized and then outputted to the digital decoding unit 30.

The digital decoding unit 30 is equipped with a demultiplexer 31, an audio decoder 32, a graphics generator 33 and a video decoder 34. The demultiplexer 31 serves to separate the TS outputted from the OFDM demodulator 13 or 23 into program audio information (i.e. audio stream), program image information (i.e. video stream), broadcast information of program (e.g. Carousel, SI (Service Information), EPG (Electronic Program Guide) or the like). Of those separated by the demultiplexer 31, the program audio information is outputted to the audio decoder 32, the program image information is outputted to the video decoder 34 and the broadcast information is outputted to the broadcast information storing unit 80 through the control unit 90.

The audio decoder 32 serves to decode the program audio information separated from TS by the demultiplexer 31. The program audio decoded by the audio decoder 32 is outputted to the audio selecting unit 40.

The video decoder 34 serves to decode the program image information separated from TS by the demultiplexer 31. The program image decoded by the video decoder 34 is outputted to the image selecting/combining unit 50.

The graphics generator 33 serves to extract broadcast information stored in the broadcast information storing unit 80, and generate graphics of data broadcasting, superimposed characters, program list or the like. The graphics generated by the graphics generator 33 is outputted individually to the output controlling unit 60 or 70.

The audio selecting unit 40 serves to select audio of a program from among a plurality of program audios outputted from the audio decoder 32. The program audio selected by the audio selecting unit 40 is individually outputted to the output controlling unit 60 or 70.

Figure 2:
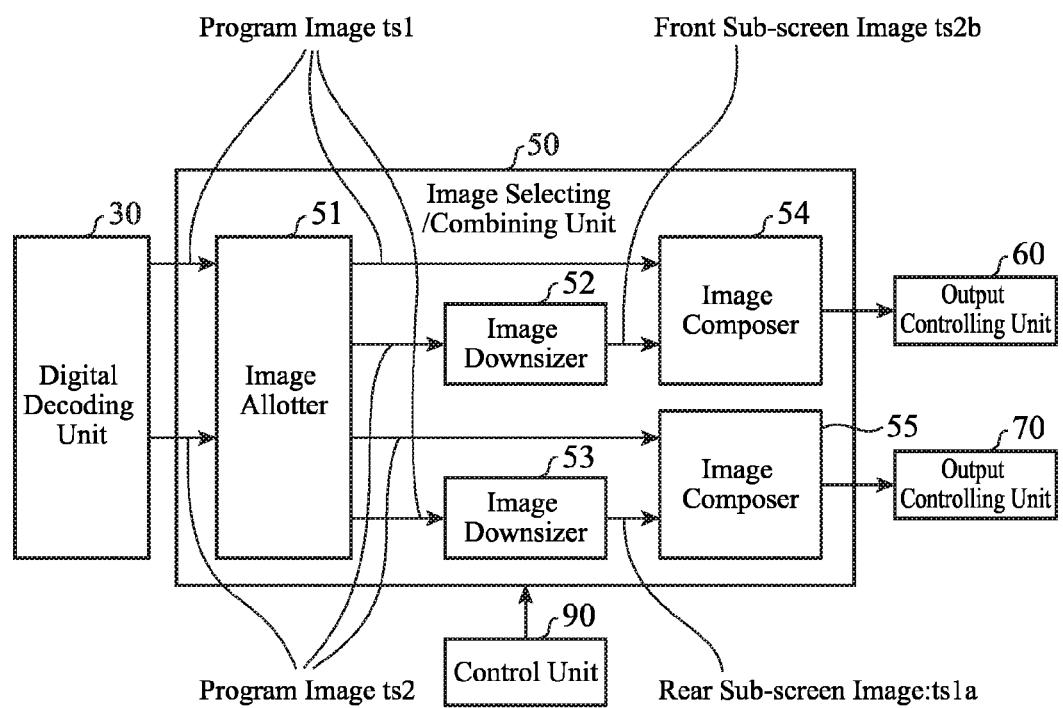
FIG. 2 is a block diagram showing a configuration of an image selecting/combining unit of the digital broadcast receiver according to Embodiment 1 of the present invention.

The image selecting/combining unit 50 serves to selectively combine the program images among a plurality of program images outputted from the video decoder 34. The program images selectively combined by the image selecting/combining unit 50 are individually outputted to the output controlling unit 60 or 70. As shown in FIG. 2, the image selecting/combining unit 50 is equipped with an image allotter 51, image downsizers 52 and 53, and image composers 54 and 55.

The image allotter 51 serves to allot a plurality of program images outputted from the digital decoding unit 30 to the image downsizers 52, 53 and the image composers 54, 55.

The image downsizers 52 and 53 serve to generate a sub-screen image (i.e. a downsized image) on a basis of the program image allotted by the image allotter 51. The sub-screen images generated by the image downsizers 52 and 53 are outputted to the corresponding image composers 54 and 55.

The image composers 54 and 55 serve to combine at least one of the program images allotted by the image allotter 51 as a main-screen with the sub-screen image resulted from the downsizing process by the image downsizer 52 or 53 as a sub-screen.

The output controlling units 60 and 70 are equipped with display controllers 61, 71 and audio controllers 62, 72, respectively.

The display controllers 61 and 71 serve to combine the graphics generated by the graphics generator 33 with the program image outputted from the image selecting/combining unit 50. The program images combined by the display controllers 61 and 71 are outputted to monitors 102 and 112, respectively.

The audio controllers 62 and 72 serve to control the program audios outputted from the audio selecting unit 40. The program audios controlled by the audio controllers 62 and 72 are outputted to speakers 103 and 113, respectively.

The broadcast information storing unit 80 serves to store the broadcast information separated from TS by the digital decoding unit 30.

Figure 3:
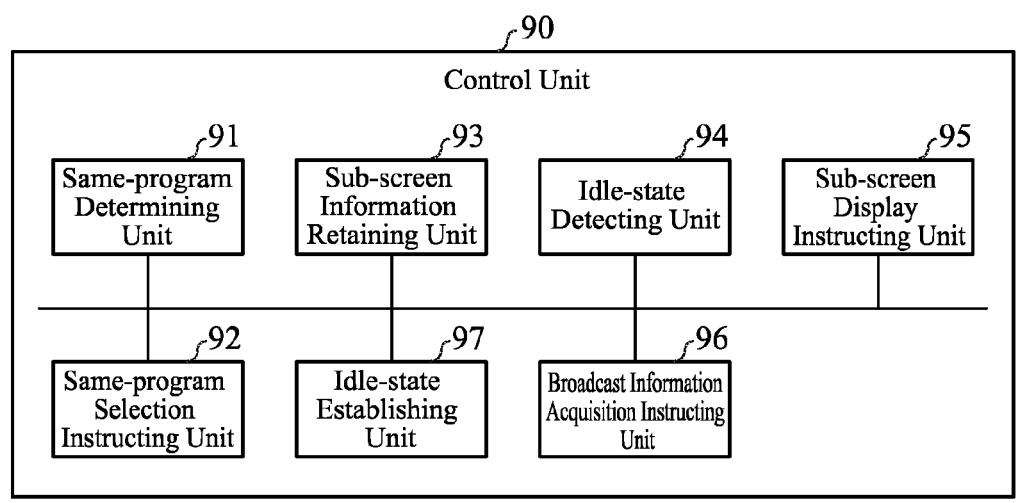
FIG. 3 is a block diagram showing a configuration of a control unit of the digital broadcast receiver according to Embodiment 1 of the present invention.

The control unit 90 serves to entirely control the digital broadcast receiver 1 in accordance with signals outputted from manipulation input units 101 and 111 that receive a variety of instructions from users. As shown in FIG. 3, the control unit 90 is equipped with a same-program determining unit 91, a same-program selection instructing unit 92, a sub-screen information retaining unit 93, an idle-state detecting unit 94, a sub-screen display instructing unit 95, a broadcast information acquisition instructing unit 96 and an idle-state establishing unit 97.

The same-program determining unit 91 serves to determine, when an instruction to select a program for the monitor 102 (112) is issued by a user through the manipulation input unit 101 (111), whether the program image instructed from the user is the same as the program image received by the broadcast receiving unit 20 (10) which is other than the broadcast receiving unit 10 (20) corresponding to the monitor 102 (112) as a target of the user's instruction.

The same-program selection instructing unit 92 serves to control the broadcast receiving unit 10 (20), when the same-program determining unit 91 has determined that the program image instructed from the user is the same as the program image received by the broadcast receiving unit 20 (10) which is other than the broadcast receiving unit 10 (20) corresponding to the monitor 102 (112) as a target of the user's instruction, to halt receiving the program image instructed by the user, and to control the monitor 102 (112) to display the program image from the broadcast receiving unit 20 (10).

The sub-screen information retaining unit 93 serves to retain sub-screen information indicating an image size of sub-screen and an arrangement of sub-screen, which are utilized for displaying program images combined with sub-screen images on the monitor 102 and/or 112.

The idle-state detecting unit 94 serves to detect the broadcast receiving unit 10 or 20, which is not receiving broadcast wave (i.e. program images), that is, detect the broadcast receiving unit 10 or 20 in an idle-state.

The sub-screen display instructing unit 95 serves to control the monitor 102 (112), when an instruction to display a sub-screen for the monitor 102 (112) is issued by a user through the manipulation input unit 101(111), to display the program image from the broadcast receiving unit 20 (10) which is other than the broadcast receiving unit 10 (20) corresponding to the monitor 102 (112), as a sub-screen.

The broadcast information acquisition instructing unit 96 serves to control the broadcast receiving unit 10 or 20 in an idle state to acquire the broadcast information, when an instruction to acquire broadcast information of available programs for viewing is issued by a user through the manipulation input unit 101 (111).

The idle-state establishing unit 97 serves to control a given broadcast receiving unit 10 (20) to halt receiving broadcast wave (i.e. program image) and turn into an idle-state, when an instruction to acquire broadcast information is issued by a user through the manipulation input unit 101 (111) and the idle-state detecting unit 94 has determined that there is no broadcast receiving unit 10 or 20 in an idle-state.

If the program images from the respective broadcast receiving units 10 and 20 are all displayed as main-screens on the respective monitors 102 and 112, the idle-state establishing unit 97 controls the broadcast receiving unit 10 (20) corresponding to the monitor 102 (112) viewed by a user, to halt receiving the program image, and control the monitor 102 (112) to display the program image from the broadcast receiving unit 20 (10) as a main-screen.

On the other hand, if there is a broadcast receiving unit 20 (10) which is receiving a program image not displayed as a main-screen either on the monitor 102 nor 112, the idle-state establishing unit 97 controls the broadcast receiving unit 20 (10) to halt receiving the program image.

Since Embodiment 1 is assumed that the output units 100 and 110 are placed respectively in a front seat side and a rear seat side, they are defined as a front-seat-side output unit 100 and a rear-seat-side output unit 110. The output units 100 and 110 are equipped with the manipulation input units 101 and 111, remote controllers 101a and 111a for outputting signals to the manipulation input units 101 and 111 by remote operation, the monitors 102 and 112, and the speakers 103 and 113.

The manipulation input units 101 and 111 serve to accept various instructions for the digital broadcast receiver 1. Those instructions are issued by a user's manipulation through operation buttons, which are not shown in the figure, arranged on the remote controllers 101a and 111a or the manipulation input units 101 and 111. A signal indicating contents of the instruction received by the manipulation input units 101 or 111 is outputted to the control unit 90.

The monitors 102 and 112 serve to output the program images from the output controlling units 60 and 70 as video outputs.

The speakers 103 and 113 serve to output the program audios from the output controlling units 60 and 70 as audio outputs.

It is noted that hardware elements used in the respective configuration units of the digital broadcast receiver 1 are like those of a home-use digital TV broadcast receiver. For example, each hardware elements corresponding to the broadcast receiving units 10 and 20 may comprise electric wave receiver circuits, tuners, and LSIs (Large Scale Integration) for digital demodulation. The hardware element corresponding to the digital decoding unit 30 may comprise multi-input multi-output LSIs for processing MPEG (Moving Picture Experts Group). Each hardware elements corresponding to the output controlling units 60 and 70 may comprise an audio output circuit and a video output circuit. Each hardware elements corresponding to the manipulation input units 101 and 111 may comprise a remote control reception circuit and so on. The hardware element part corresponding to the broadcast information storing unit 80 may comprise a volatile memory and/or a non-volatile memory. The hardware element corresponding to the control unit 90 may comprise a microcomputer and a volatile memory and/or a non-volatile memory.

The whole operation of the digital broadcast receiver 1 configured as the above is described in below.

The antennas 11 and 21 receive broadcast waves of desired channels selected by tuners 12 and 22 from among broadcast waves transmitted over Channels 13-62 in UHF region. The OFDM demodulators 13 and 23 perform OFDM demodulation on the received broadcast waves, and thereby output TS as broadcast program data to the digital decoding unit 30. It is noted that TS is a data string (or stream) multiplexing video & audio streams and broadcast information such as program information, data broadcasts, superimposed characters and the like, in accordance with MPEG-2 standard and ARIB (Association of Radio Industries and Business) standard.

Hereinafter, when necessary to distinguish each TS, a TS outputted from the broadcast receiving unit 10 is referred to as "TS1", and a TS outputted from the broadcast receiving unit 20 is referred to as "TS2". Also, a suffix "ts1" or "ts2" is added as a word termination. For example, the respective data separated from TS1 are expressed as Audio stream is Video stream is Broadcast information ts1. The data separated from TS2 are expressed as Audio stream ts2/Video stream ts2/Broadcast information ts2. When unnecessary to distinguish them, no suffix is added.

The digital decoding unit 30 decodes the respective broadcast program data demodulated by the respective broadcast receiving units 10 and 20 to generate program images in a format displayable on the monitors 102 and 112.

The demultiplexer 31 analyzes information multiplexed in TS1 and TS2 to separate it into program audio information, program image information and broadcast information. The broadcast information separated by the demultiplexer 31 is outputted to the control unit 90, and is stored in the broadcast information storing unit 80 after being subjected to a data transformation.

The graphics generator 33 extracts broadcast information stored in the broadcast information storing unit 80, and generates graphics of data broadcasting, superimposed characters, program list or the like. The audio decoder 32 decodes audio stream ts1 and audio stream ts2 separated by the demultiplexer 31, and outputs them as program audio is 1 and program audio ts2. The video decoder 34 decodes video stream is 1 and video stream ts2 separated by the demultiplexer 31, and outputs them as program image ts1 and program image ts2.

It is noted that the digital decoding unit 30 can receive plural inputs of TSs, and output the program images, the program audios and the graphics to plural output destinations. The digital decoding unit 30 serves to perform a multi-input and multi-output operation. For example, in Embodiment 1, two TSs are inputted, and outputs are made to two output destinations.

The display controllers 61 and 71 perform to combine the program images outputted from the image selecting/combining unit 50 with the graphics relating to data broadcasting, superimposed characters, captions, EPG or the like outputted from the graphics generator 33, and/or with the graphics for a menu screen. The program images combined by the display controllers 61 and 71 are respectively outputted to the monitors 102 and 112.

It is noted that, although the graphics for a menu screen is assumed to be generated by the control unit 90, it may instead be generated by the graphics generator 33.

The audio selecting unit 40 allocates the program audio ts1 and the program audio ts2 outputted from the digital decoding unit 30 to the audio controller 62 and the audio controller 72, respectively. Then, the audio controllers 62 and 72 control audio volume or the like on the allocated program audios ts1 and ts2. Subsequently, the program audio ts1 is outputted toward a front-seat user through the front speaker 103, and the program audio ts2 is outputted toward a rear-seat user through the rear speaker 113.

An operation of same-program display implemented by the digital broadcast receiver 1 is described in below.

Hereinafter, an operation of displaying a program image as a main-screen on the monitor 102 or 112 is defined as "main-display". An operation of selecting a broadcast program for main-display by a broadcast receiving unit is defined as "main-selection". An operation of selecting a program image for a sub-screen by a broadcast receiving unit is defined as "sub-selection".

Furthermore, the program images received by the broadcast receiving units 10 and 20, and also main-displayed on the monitors 102 and 112, are defined as "program image is ts1" and "program image ts2", respectively. Also, the images resulted from downsizing process on the program images ts1 and ts2 are defined as "sub-screen image ts1a" and "sub-screen image ts2a", respectively.

Moreover, the users who are viewing the monitors 102 and 112 are referred to as "a front-seat user" and "a rear seat-user", respectively. When unnecessary to distinguish between the front-seat and the rear-seat, each user is simply referred to as a user.

Hereinafter, for the sake of simplicity, the description will be made for the case where different program images (Program 1 and Program 2) are main-displayed on the monitors 102 and 112, respectively, as shown in FIG. 5(*a*), and in that state, an instruction is issued to select a program for the rear monitor 112.

Figure 4:
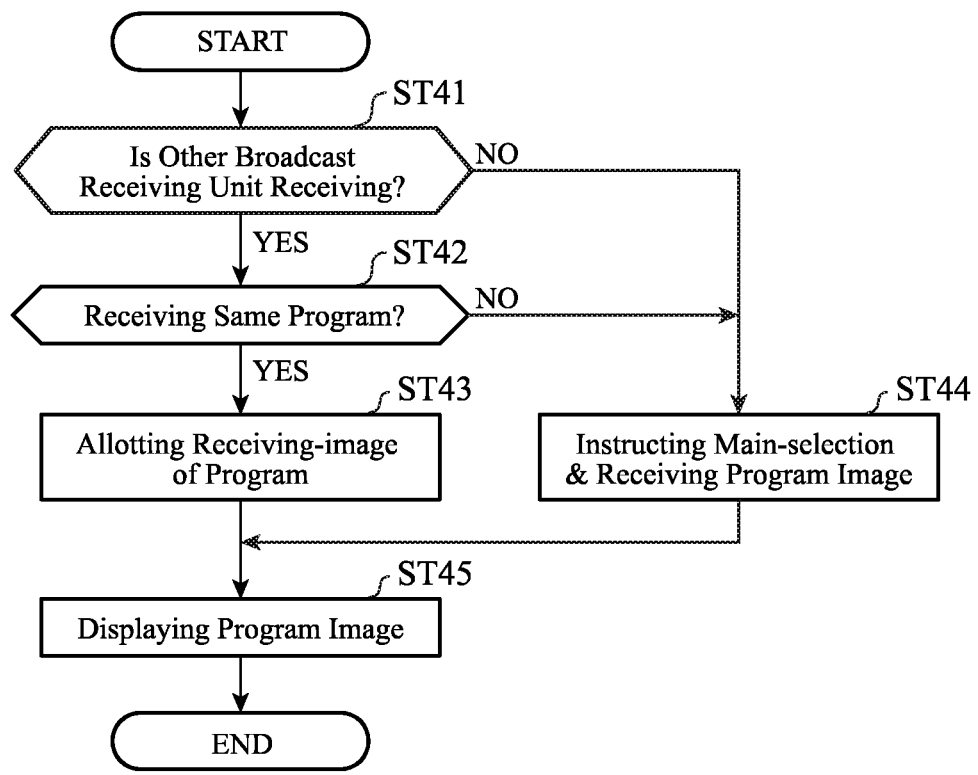
FIG. 4 is a flowchart showing a same-program display operation of the digital broadcast receiver according to Embodiment 1 of the present invention.

As shown in FIG. 4, when an instruction to select a program for the rear monitor 112 is issued by the rear-seat user through the manipulation input unit 111, the idle-state detecting unit 94 determines whether a program image ts1 is received by the broadcast receiving unit 10 which is other than the broadcast receiving unit 20 corresponding to the rear monitor 112 (Step ST41).

In Step ST41, if the idle-state detecting unit 94 determines that the program image ts1 is received by the broadcast receiving unit 10, the same-program determining unit 91 determines whether the program image ts1 from the broadcast receiving unit 10 is the same as the program image corresponding to the instruction by the user (Step ST42).

In Step ST42, when the same-program determining unit 91 determines that the program image is 1 from the broadcast receiving unit 10 is the same as the program image instructed by the user, the same-program selection instructing unit 92 controls the broadcast receiving unit 20 to halt receiving the program image ts2, and controls the image allotter 51 to allot the program image ts1 to the image composer 55 (Step ST43). The program image ts1 allotted to the image composer 54 is main-displayed on the rear monitor 112 (Step ST45).

In this way, as shown in FIG. 5(*b*), the program image ts1 (Program 1) from the broadcast receiving unit 10, which is the same as that displayed on the front monitor 102, is main-displayed on the rear monitor 112. Therefore, it is achieved that the broadcast receiving unit 20 turns into an idle-state.

Meanwhile, if the idle-state detecting unit 94 determines that the program image ts1 has not been received by the broadcast receiving unit 10 in Step ST41, or if the same-program determining unit 91 determines that the program image ts1 from the broadcast receiving unit 10 is not the same as the program image instructed by the user in Step ST42, the control unit 90 controls the broadcast receiving unit 20 to receive the program image ts2 that is instructed by the user (Step ST44). Then the program image ts2 received by the broadcast receiving unit 20 is displayed on the rear monitor 112 (Step ST45).

An operation of sub-screen display implemented by the digital broadcast receiver 1 will be described.

Hereinafter, for the sake of simplicity, the description will be made for the case where a sub-screen is to be displayed on the rear monitor 112.

Figure 6:
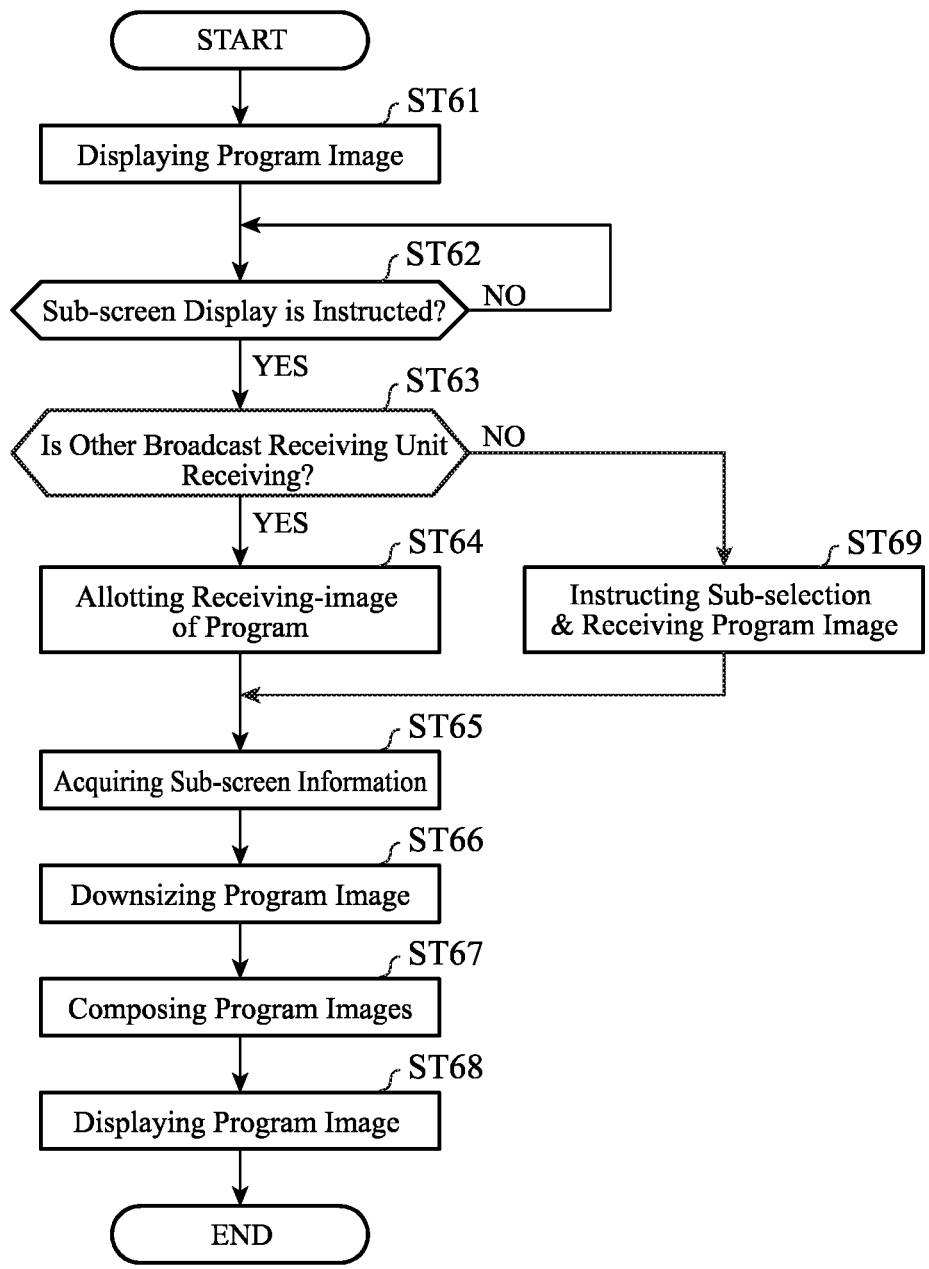
FIG. 6 is a flowchart showing a sub-screen display operation of the digital broadcast receiver according to Embodiment 1 of the present invention.

As shown in FIG. 6, when the output unit 110 is powered on by the rear-seat user through the manipulation input unit 111, the digital broadcast receiver 1 displays the program image ts2 received by the broadcast receiving unit 20 on the rear monitor 112 as main-display image (Step ST61).

Figure 7:
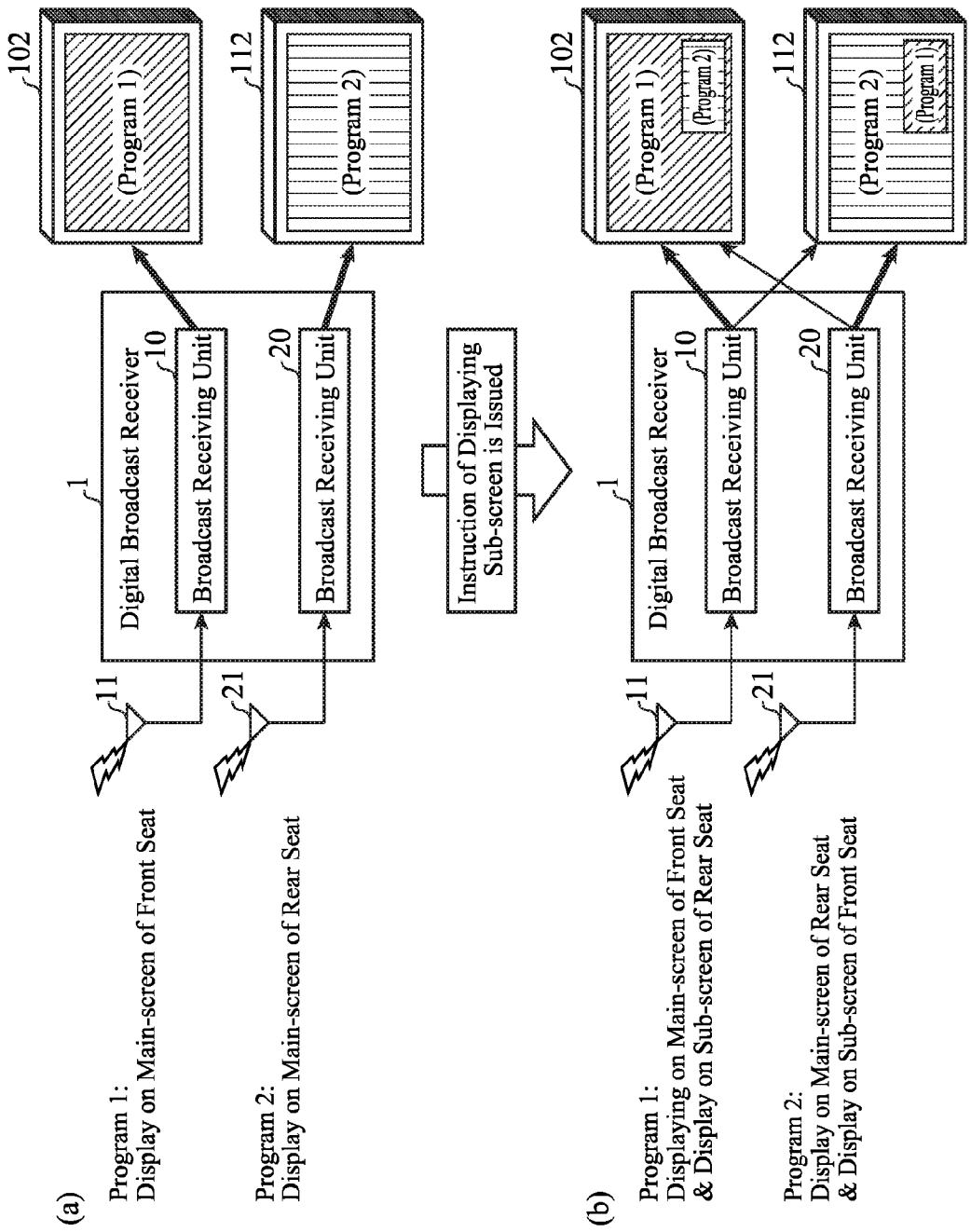
FIG. 7 is a schematic view illustrating the sub-screen display operation of the digital broadcast receiver according to Embodiment 1 of the present invention, in which the diagram (a) shows main-screen displays on both monitors, and the diagram (b) shows main-screen and sub-screen displays on both monitors.

The program image ts2 (Program 2) from the broadcast receiving unit 20 is therefore main-displayed on the rear monitor 112, as shown in FIG. 7(a). In this example shown by FIG. 7(a), the program image ts1 (Program 1) from the broadcast receiving unit 10 is main-displayed on the front monitor 102.

The sub-screen display instructing unit 95 determines whether an instruction to display a sub-screen is issued by the rear-seat user through the manipulation input unit 111 (Step ST62).

In Step ST62, when the sub-screen display instructing unit 95 determines that there is no instruction to display a sub-screen by the rear-seat user, the sequence is returned to Step ST62 and placed in a standby-state.

On the other hand, in Step ST62, when the sub-screen display instructing unit 95 determines that an instruction to display a sub-screen is issued by the rear-seat user, the idle-state detecting unit 94 determines whether the program image ts1 is received by the broadcast receiving unit 10 which is other than the broadcast receiving unit 20 (Step ST63).

In Step ST63, when the idle-state detecting unit 94 determines that the program image ts1 is received by the broadcast receiving unit 10, the sub-screen display instructing unit 95 controls the image allotter 51 to allot the program image ts1 to the image downsizer 53 (Step ST64).

The image selecting/combining unit 50 acquires sub-screen information indicating a display size of sub-screen and information for defining an arrangement of sub-screen from the sub-screen information retaining unit 93 (Step ST65).

The image downsizer 53 downsizes the program image ts1 in accordance with the acquired sub-screen information, and thereby generates a sub-screen image ts1 a (Step ST66). The sub-screen image is 1 a generated by the image downsizer 53 is outputted to the image composer 54.

The image composer 54 combines the program image ts2, which is main-displayed on the rear monitor 112, with the sub-screen image is 1 a generated by the image downsizer 53 at Step ST66 in accordance with the acquired sub-screen information (Step ST67). The program image combined by the image composer 54 is displayed on the rear monitor 112 through the display controller 71 (Step ST68).

In this way, as shown in FIG. 7(b), the program image ts1 (Program 1) from the broadcast receiving unit 10 is displayed on the rear monitor 112 as a sub-screen. In this example shown by FIG. 7(b), such a case is illustrated where an instruction to display a sub-screen is issued also for the front monitor 102, so that the program image ts2 (Program 2) from the broadcast receiving unit 20 is displayed on the monitor as a sub-screen.

On the other hand, in Step ST63, when the idle-state detecting unit 94 determines that the front monitor 102 is in power-off, that is, the first broadcast receiving unit 10 has not received the program image ts1, the sub-screen display instructing unit 95 controls the broadcast receiving unit 10 to perform sub-selection, and thereby causing it to receive the program image ts1 (Step ST69). Thereafter, operations following to Step ST65 are made, and thereby synthesizing and displaying of program images are performed. In this situation, no program image is displayed on the front monitor 102.

It is noted that the sub-screen display operation for the front monitor 102 is similar to the above, and thus its description is omitted here.

An operation of a broadcast information acquisition implemented by the digital broadcast receiver 1 will be described.

Hereinafter, for the sake of simplicity, the description will be made for the case where an instruction to acquire broadcast information is issued by the rear-seat user.

Figure 8:
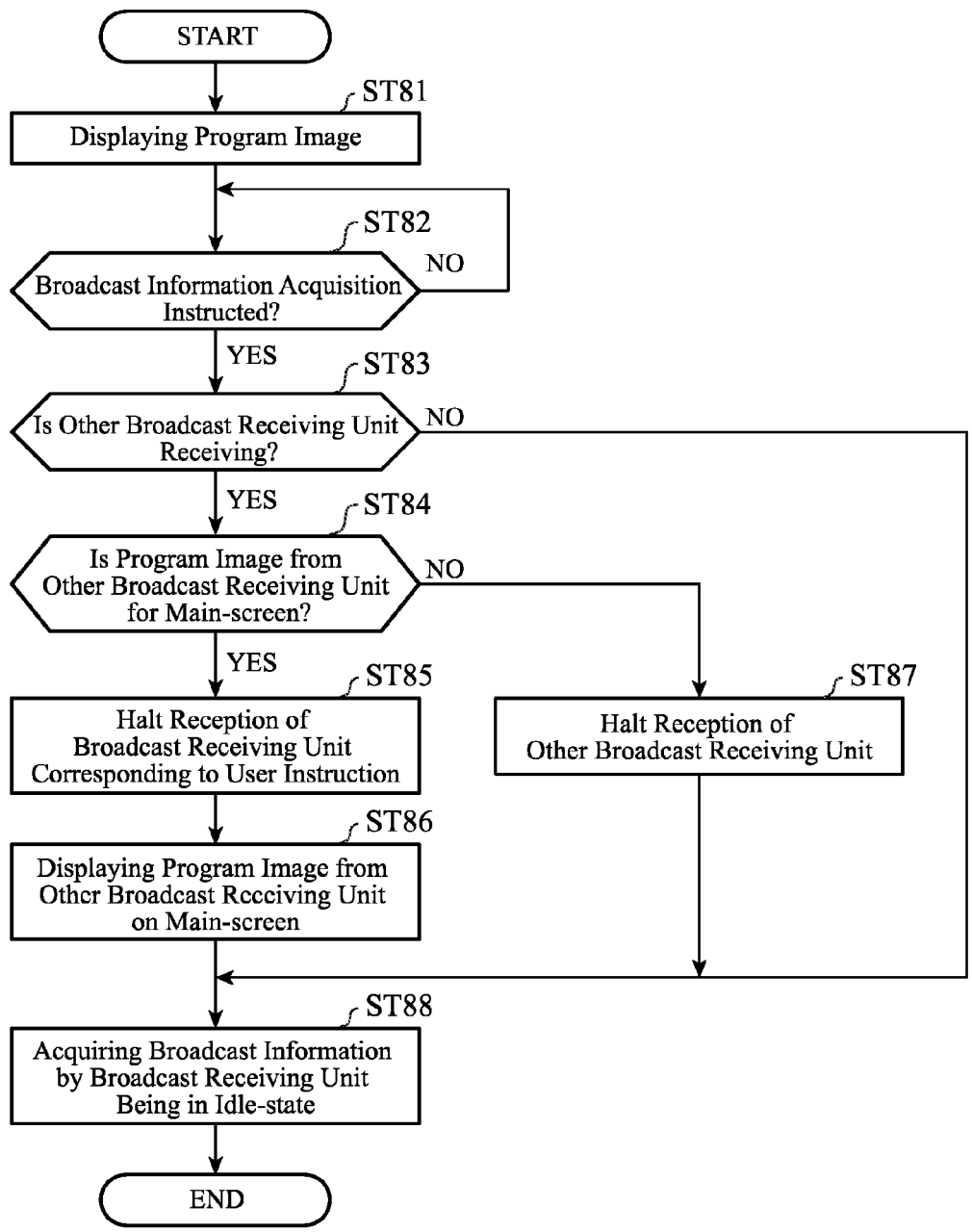
FIG. 8 is a flowchart showing a broadcast information acquiring operation of the digital broadcast receiver according to Embodiment 1 of the present invention.

As shown in FIG. 8, when the output unit 110 is powered on by the rear-seat user through the manipulation input unit 111, the digital broadcast receiver 1 displays the program image ts2 received by the broadcast receiving unit 20 on the rear monitor 112 as main-display image (Step ST81).

The program image ts2 (Program 2) from the broadcast receiving unit 20 is main-displayed on the rear monitor 112, as shown in FIG. 9(a). In this example shown by FIG. 9(a), the program image ts1 (Program 1) from the broadcast receiving unit 10 is also displayed on the front monitor 112 as a sub-screen.

The broadcast information acquisition instructing unit 96 determines whether an instruction to acquire broadcast information of available programs for viewing is issued by the rear-seat user through the manipulation input unit 111 (Step ST82).

In Step ST82, when the broadcast information acquisition instructing unit 96 determines that there is no instruction to acquire the broadcast information by the rear-seat user, the sequence is returned to Step ST82 and placed in a standby-state.

On the other hand, in Step ST82, when the broadcast information acquisition instructing unit 96 determines that an instruction to acquire the broadcast information is issued by the rear-seat user, the idle-state detecting unit 94 determines whether the program image ts1 is received by the broadcast receiving unit 10 which is other than the broadcast receiving unit 20 (Step ST83).

In Step ST83, when the idle-state detecting unit 94 determines that the program image ts1 is not received by the broadcast receiving unit 10, the sequence jumps to Step ST88.

On the other hand, in Step ST83, when the idle-state detecting unit 94 determines that the program image ts1 is received by the broadcast receiving unit 10, the idle-state establishing unit 97 determines whether the image allotter 51 allots the program image ts1 from the broadcast receiving unit 10 to the image composer 54, that is, whether the program image from the broadcast receiving unit 10 is displayed on the monitor 102 as a main-screen (Step ST84).

In Step ST84, when the idle-state establishing unit 97 determines that the program image from the broadcast receiving unit 10 is displayed on the monitor 102 as a main-screen, the idle-state establishing unit controls the broadcast receiving unit 20, which corresponds to the monitor 112 viewed by the rear-seat user, to halt receiving the program image ts2 (Step ST85). The idle-state establishing unit 97 controls the image allotter 51 to allot the program image ts1, which is from the broadcast receiving unit 10 instead of the broadcast receiving unit 20, to the image composer 55 (Step ST86). The broadcast program image is 1 allotted by the image allotter 51 is main-displayed on the rear monitor 112.

In this way, it becomes possible for a user to view a program at the time of acquiring broadcast information, by controlling the monitor 112 to perform main-display of the program image (Program 1) received by the broadcast receiving unit 10 when the broadcast receiving unit 20 is placed in an idle state, as shown in FIG. 9(b).

On the other hand, in Step ST84, when the idle-state establishing unit 97 determines that the image allotter 51 allots the program image ts1 only to the image downsizer 53, that is, the program image ts1 from the broadcast receiving unit 10 is not displayed on the monitor 102 as a main-screen, the idle-state establishing unit controls the broadcast receiving unit 10 to halt receiving (Step ST87). For example, in the case where the monitor 102 is powered off and the program image ts2 is only used to display a sub-screen on the monitor 112, the broadcast receiving unit 10 is caused to halt sub-selection and utilized for acquiring broadcast information. This allows a user to keep viewing a program at the time of acquiring broadcast information.

Subsequently, as shown in FIG. 9(c), the broadcast information acquisition instructing unit 96 controls the broadcast receiving unit 10 in an idle-state to acquire the broadcast information (Step ST88).

It is noted that a similar operation is applied in the case where an instruction to acquire broadcast information is issued by the front-seat user, and thus its description is omitted here.

As described above, according to Embodiment 1 of the present invention, it is configured such that, when an instruction to acquire broadcast information is issued by a user even in a state where the program images ts1 and ts2 from the broadcast receiving units 10 and 20 are all main-displayed on the monitors 102 and 112, the broadcast receiving unit 10 (20) corresponding to the monitor 102 (112) being viewed by the user is caused to halt receiving and instead to acquire the broadcast information, while main-displaying the program image from the other broadcast receiving unit 20 (10) also on the monitor 102. This configuration allows the user to get the broadcast information while keeping viewing a program, even when the broadcast receiving units 10 and 20 are not in an idle-state when the instruction to acquire the broadcast information is issued, thereby preventing the user from being interrupted from viewing a program.

It is noted that, although the description of the digital broadcast receiver 1 of Embodiment 1 is made for the case of having two broadcast receiving units 10 and 20 and two monitors 102 and 112, the present invention is not limited thereto, and may be similarly applied to such a digital broadcast receiver 1 having N number ("N" denotes two or more) of broadcast receiving units and N number of monitors.

Embodiment 2

The digital broadcast receiver 1 of Embodiment 1 is described as configured to provide two broadcast receiving units 10 and 20 so that a main-screen and a sub-screen are to be displayed on each of two monitors 102 and 112. In contrast, a digital broadcast receiver 1 of Embodiment 2 is configured to provide three broadcast receiving units 10, 20 and 120, so that a main-screen and two sub-screen are to be displayed on each of two monitors 102 and 112.

It is noted that, for the analogous configurations and operations to those of Embodiment 1, the same symbols are applied to the related parts and description thereof is omitted.

Figure 10:
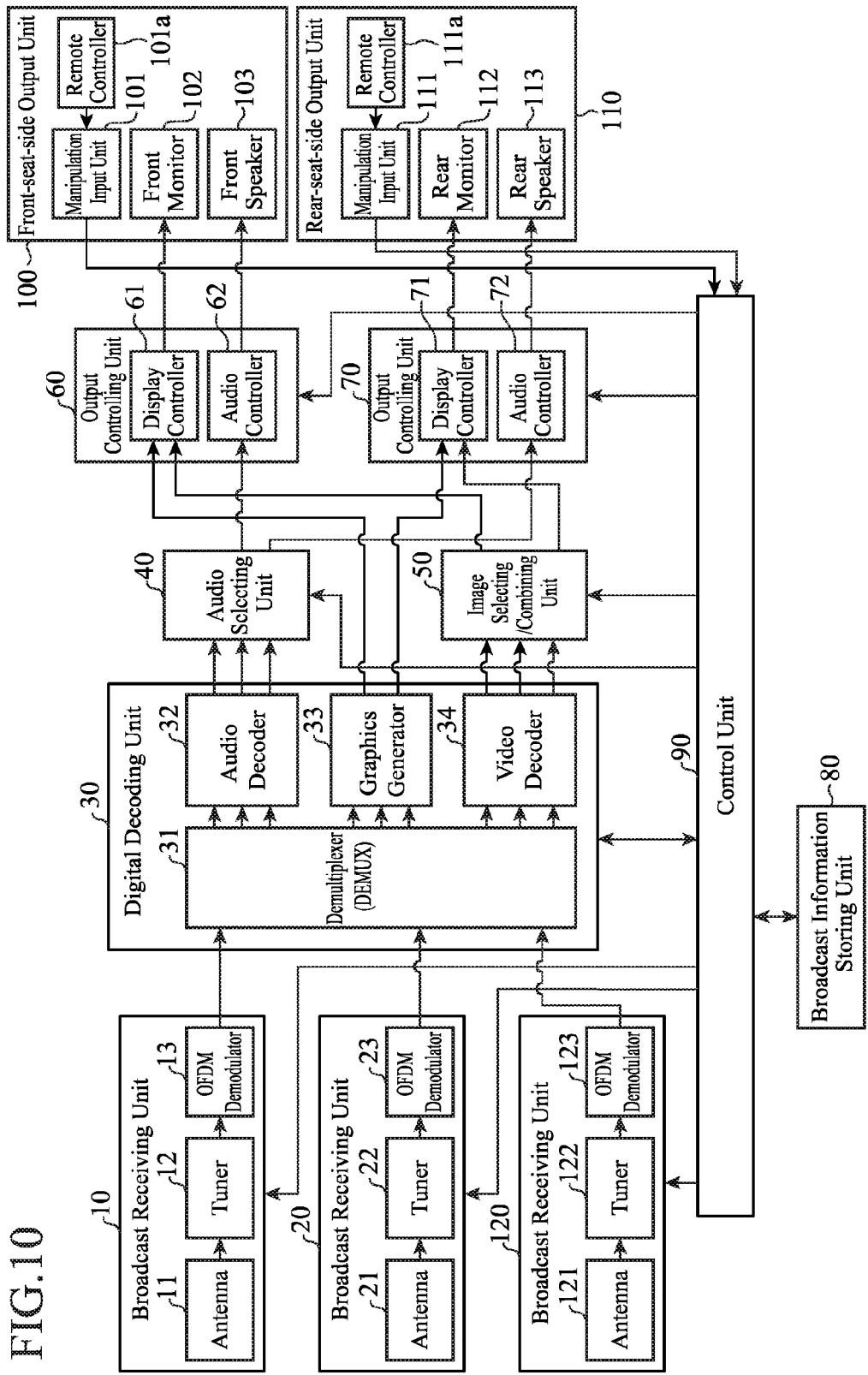
FIG. 10 is a block diagram showing a configuration of a digital broadcast receiver according to Embodiment 2 of the present invention.

The digital broadcast receiver 1 of Embodiment 2 shown in FIG. 10 further provides a broadcast receiving unit 120 to the digital broadcast receiver 1 of Embodiment 1 shown in FIG. 1.

The broadcast receiving unit 120 is equipped with an antenna 121, a tuner 122 and an OFDM demodulator 123. This configuration is the same as that of the broadcast receiving units 10 and 20. The broadcast program data from the broadcast receiving unit 120 is outputted together with the broadcast program data from the broadcast receiving units 10 and 20 toward the digital decoding unit 30.

When installing three broadcast receiving units 10, 20 and 120 with respect to two monitors 102 and 112, at least one of the broadcast receiving units necessarily preforms sub-selection when causing all of the three broadcast receiving units 10, 20 and 120 to receive program images. This is because the number of monitors capable of displaying main screen is two.

For example, in FIG. 11(a), the program image ts1 (Program 1) from the broadcast receiving unit 10 is main-displayed on the monitor 102 and displayed as a sub-screen (sub-displayed) on the monitor 112. The program image ts2 (Program 2) from the broadcast receiving unit 20 is main-displayed on the monitor 112 and sub-displayed on the monitor 102. And, the program image ts3 (Program 3) from the broadcast receiving unit 120 is sub-displayed on the monitors 102 and 112.

In that situation, when an instruction to acquire broadcast information is issued by the rear-seat user, the broadcast receiving unit 120; that is performing only sub-selection, is controlled to halt receiving and to acquire the broadcast information, as shown in FIG. 11(b).

This control allows the user to keep viewing a main-displayed program during acquiring the broadcast information, and thereby preventing the user from being interrupted from viewing a program.

As described above, according to Embodiment 2 of the present invention, it is configured such that, when there is a broadcast receiving unit performing only sub-selection, the broadcast receiving unit is caused to halt receiving the program image and instead to acquire broadcast information. This configuration allows the user to get the broadcast information while keeping viewing a program, even when the broadcast receiving units 10, 20 and 120 are not in an idle-state when the instruction to acquire the broadcast information is issued, and thereby preventing the user from being interrupted from viewing a program.

It is noted that, although the description of the digital broadcast receiver 1 of Embodiment 2 is made for the case of having three broadcast receiving units 10, 20 and 120 for two monitors 102 and 112, the present invention is not limited thereto, and may be similarly applied to such a digital broadcast receiver 1 having N+M ("M" denotes one or more) number of broadcast receiving units relative to N number ("N" denotes two or more) of monitors. By providing more broadcast receiving units than monitors, a high-sensitive and fast processing of acquiring broadcast information can be achieved while keeping a sub-screen display.

Embodiment 3

In Embodiments 1 and 2, the each digital broadcast receiver is described as configured to establish an idle-state of a given broadcast receiving unit and to cause it to acquire broadcast information, when there is issued an instruction to acquire the broadcast information and there is no broadcast receiving unit in an idle-state. In contrast, a digital broadcast receiver 1 of Embodiment 3 is configured to cause a given monitor to display a program list, so that a program selection is made for another monitor.

For the analogous configurations and operations to those of Embodiment 1, the same symbols are applied to the related parts and description thereof is omitted. Also, the structure of the digital broadcast receiver 1 of Embodiment 3 is the same as the structure of the digital broadcast receiver 1 of Embodiment, shown in FIG. 1, and description thereof is omitted.

Figure 12:
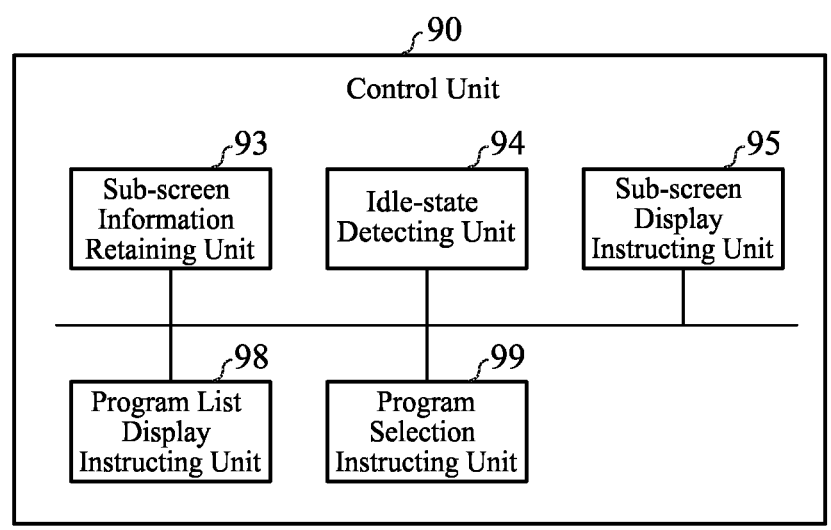

As shown in FIG. 12, a control unit 90 of the digital broadcast receiver 1 of Embodiment 3 is provided by deleting, from the control unit 90 of the digital broadcast receiver 1 of Embodiment 1, the same-program determining unit 91, the same-program selection instructing unit 92, the broadcast information acquisition instructing unit 96 and the idle-state establishing unit 97, and by installing a program list display instructing unit 98 and a program selection instructing unit 99.

The program list display instructing unit 98 serves to cause the display controller 61 (71) corresponding to a given monitor 102 (112) to output to be displayed on the monitor 102 (112), a program list generated by the graphics generator 33, when an instruction to display the program list is issued by a user through the manipulation input unit 101 (111).

The program selection instructing unit 99 serves to control a given broadcast receiving unit 10 or 20 to receive a program image instructed by a user, and to control the monitor 112 (102) to display the program image as a main-screen, when an instruction to select the program for a main-screen or a sub-screen of the other monitor 112 (102) is issued by the user through the manipulation input unit 101 (111) based on the program list displayed on the given monitor 102 (112).

When an instruction to select a program for a main-screen of the other monitor 112 (102) is issued, the program selection instructing unit 99 controls the broadcast receiving unit 20 (10) corresponding to the other monitor 112 (102) to receive the program image instructed by the user, and controls the monitor 112 (102) to display the program image as a main-screen. In contrast, when an instruction to select a program for a sub-screen of the other monitor 112 (102) is issued, the program selection instructing unit 99 controls the broadcast receiving unit 10 (20) corresponding to the given monitor 102 (112) to receive the program image instructed by the user, and controls the monitor 112 (102) to display the program image from the broadcast receiving unit 10 (20) as a sub-screen.

The program selection operation of the digital broadcast receiver 1 will be described.

Hereinafter, for the sake of simplicity, the description will be made for the case where a program for the front monitor is to be selected by way of displaying a program list on the rear monitor. It is assumed that the front monitor is powered on and main-displays the program image ts1 from the broadcast receiving unit 10.

Figure 13:
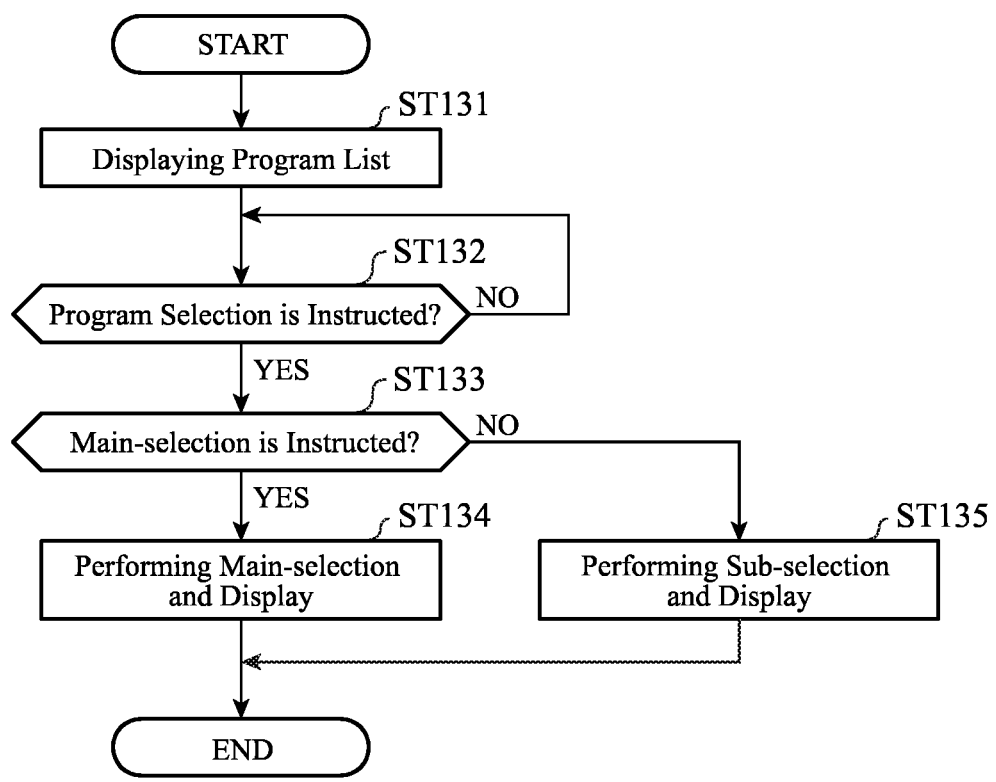
FIG. 13 is a flowchart showing a program selection operation of the digital broadcast receiver according to Embodiment 3 of the present invention.

As shown in FIG. 13, when the output unit 110 is powered on and an instruction to display a program list is issued by the rear-seat user through the manipulation input unit 111, the program list display instructing unit 98 controls the display controller 71 corresponding to the rear-seat user to output the program list generated by the graphics generator 33, and controls the rear monitor 112 to display the program list (Step ST131).

Then, the program selection instructing unit 99 determines whether an instruction to select a program for the front monitor 102 is issued by the rear-seat user through the manipulation input unit 111 on the basis of the program list displayed on the rear monitor 112 (Step ST132).

In Step ST132, when the program selection instructing unit 99 determines that there is no instruction to select a program for the front monitor 102 by the rear-seat user, then the sequence is returned to Step ST132 and placed in a standby-state.

On the other hand, when determining in Step ST132 that there is issued an instruction to select a program for the front monitor 102 by the rear-seat user, the program selection instructing unit 99 determines whether the instruction is for main-selection (Step ST133).

When determining in Step ST133 that the instruction indicates main-selection for the front monitor 102 by the rear-seat user, the program selection instructing unit 99 controls the broadcast receiving unit 10 corresponding to the front monitor 102 to receive the program image and controls the front monitor 102 to main-display (Step ST134).

Figure 14:
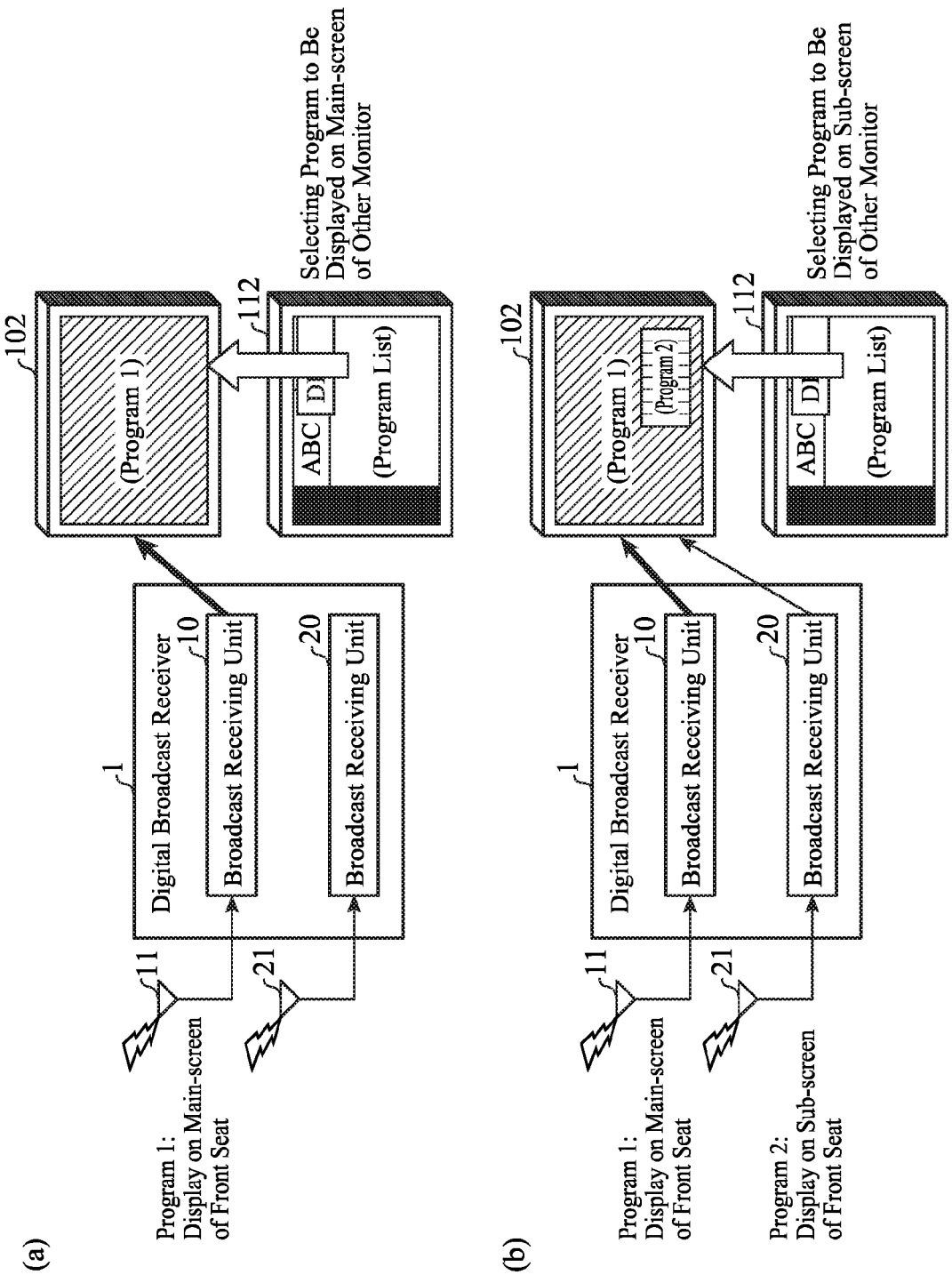
FIG. 14 is a schematic view illustrating the program selection operation of the digital broadcast receiver according to Embodiment 3 of the present invention, in which the diagram (a) shows a main-screen program selected state on a different monitor, and the diagram (b) shows a sub-screen program selected state on the different monitor.

In this way, as shown in FIG. 14(*a*), it becomes possible to select a program to be main-displayed on the front monitor 102 based on a program list displayed on the rear monitor 112. Accordingly, a program list can be displayed while keeping user's viewing a program by utilizing the rear monitor 112 as a secondary screen for the front monitor 102.

On the other hand, when determining in Step ST133 that there is issued an instruction of sub-selection for the front monitor 102 by the rear-seat user, the program selection instructing unit 99 controls the broadcast receiving unit 20 corresponding to the monitor 112 on which the program list is displayed, to receive the program image instructed by the user and controls the front monitor 102 to sub-display the image (Step ST135).

In this situation, the broadcast receiving unit 20, which corresponds to the monitor 112 displaying the program list, becomes in an idle-state after receiving broadcast information for producing the program list. By controlling the broadcast receiving unit 20 in the idle-state to perform sub-selection, it becomes possible to select a program to be sub-displayed on the front monitor 102, based on a program list displayed on the rear monitor 112, as shown in FIG. 14(*b*). In this way, a program list can be displayed while keeping user's viewing of a program by utilizing the rear monitor 112 as a secondary screen.

As described above, according to Embodiment 3 of the invention, it is configured to execute, based on the program list displayed on a given monitor 112 (102), program selection for a main-screen or a sub-screen on the other monitor 102 (112). Therefore, a program list can be displayed while keeping user's viewing of a program by utilizing the monitor 112 (102) displaying the program list as a secondary screen for the monitor 102(112) subject to the program selection, thereby preventing the user from being interrupted from viewing a program.

It is noted that, although the description of the digital broadcast receiver 1 of Embodiment 3 is made on the assumption that the output controlling unit 70 (60) for outputting the program list and the monitor 102 (112) for displaying the program list are connected by wire to each other, the output controlling unit 70 (60) and the monitor 102(112) may be wirelessly connected so that the monitor 102 (112) receives the program list through radio wave.

Likewise, the connection between the other monitor 102 or 112 and the output unit 60 or 70 in Embodiments 1 through 3 may be wired or connected by wireless.

Meanwhile, although the description of the digital broadcast receiver 1 of Embodiment 3 is made on the assumption that the program list is displayed on the monitor 112 (102) for selecting a program for the other monitor 102 (112), the invention is not limited thereto, and may be configured to display logos or titles indicating the respective programs on the monitor 112 (102). Further to monitors, although the description is made on the assumption that the program list is displayed on the monitor 112 (102), the invention is not limited thereto, and may be configured to display the program list, logos, titles or the like on another devices such as a liquid crystal panel mounted on the remote controller.

Furthermore, although the description of the digital broadcast receiver 1 of Embodiment 3 is made for the case of using two broadcast receiving units 10 and 20 and two monitors 102 and 112, the invention is not limited thereto, and may be similarly applied to such a digital broadcast receiver 1 having N number ("N" denotes two or more) of broadcast receiving units and L number ("L" denotes two or more) of monitors. In this instance, a user designates a monitor subject to program selection through the manipulation input unit. Alternatively, it may be configured for the user to designate through the manipulation input unit a broadcast receiving unit receiving the program image.

Moreover, although the description of the digital broadcast receivers 1 of Embodiments 1 through 3 is made for the case of the vehicle-mounted digital broadcast receiver, the invention is not limited thereto, and may be similarly applied to such a digital broadcast receiver with a plurality of monitors installed in a facility, for example.

It should be noted that unlimited combination of the respective embodiments, modification of any element in the embodiments and omission of any element in the embodiments may be made in the present invention without departing from the scope of the invention.

Industrial Applicability

The digital broadcast receiving unit according to the invention is possible to acquire broadcast information and to display a program list and select a program without interrupting a user from viewing a program by effectively utilizing a plurality of broadcast receiving units. Therefore, it is suited for use as, for example, a digital broadcast receiving device having a PinP function, for displaying images of programs received selectively by a plurality of broadcast receiving units, on a plurality of monitors that can individually and selectively display them.

The invention claimed is:

1. A digital broadcast receiver, comprising:
   a plurality of broadcast receiving units configured to receive broadcast waves including images of programs and broadcast information about the programs;
   an image selecting/combining unit that includes
      an image allotter configured to allot the program images received by the respective broadcast receiving units,
      an image downsizer configured to perform a downsizing process on the program image allotted by the image allotter, and
      an image composer configured to combine at least one of the program images allotted by the image allotter as a main-screen with the program image downsized by the image downsizer as a sub-screen;
   a plurality of monitors configured to display the program images outputted from the image selecting/combining unit;
   a manipulation input unit configured to accept an instruction from a user to acquire broadcast information about viewable programs; and
   a control unit that includes
      an idle-state detecting unit configured to detect the broadcast receiving unit in a state of not receiving program image,
      an idle-state establishing unit configured to control the broadcast receiving unit corresponding to the monitor viewed by the user to halt receiving broadcast waves and control the image selecting/combining unit to output the program image as a main-screen to said monitor, when the instruction is accepted through the manipulation input unit and when the idle-state detecting unit determines that there is no broadcast receiving unit in a state of not receiving program image, and
      a broadcast information acquisition instructing unit configured to control the broadcast receiving unit in a state of not receiving program image to acquire the broadcast information, when the instruction is accepted through the manipulation input unit.

2. The digital broadcast receiver according to claim 1, wherein
   the idle-state establishing unit is further configured to control the the broadcast receiving unit to halt receiving broadcast waves, said controlled broadcast receiving unit being in a state of receiving program image which is not displayed as a main-screen on a monitor in the situation that the instruction is accepted through the manipulation input unit and the idle-state detecting unit determines that there is no broadcast receiving unit in a state of not receiving program image.

3. A digital broadcast receiver, comprising:
   a plurality of broadcast receiving units configured to receive broadcast waves including images of programs and broadcast information about the programs;
   a broadcast information storing unit configured to store the broadcast information received by the respective broadcast receiving units;
   an image selecting/combining unit that includes
      an image allotter configured to allot the program images received by the respective broadcast receiving units,
      an image downsizer configured to perform a downsizing process on the program image allotted by the image allotter, and
      an image composer configured to combine at least one of the program images allotted by the image allotter as a main-screen with the program image downsized by the image downsizer as a sub-screen;
   a plurality of monitors configured to display the program images outputted from the image selecting/combining unit;
   a manipulation input unit configured to accept instructions from a user to display a program list and to select a program; and
   a control unit that includes
      a program list display instructing unit configured to control a given one of the monitors to display the program list based on the broadcast information stored in the broadcast information storing unit, when the instruction for displaying the program list is accepted through the manipulation input unit, and
      a program selection instructing unit configured to, when the instruction for selecting a program to be displayed as a main-screen or a sub-screen on the monitor other than the given monitor being displaying the program list is accepted through the manipulation input unit, control a given one of the broadcast receiving units to receive program image of the instructed program and control the image selecting/combining unit to output the program image received by the given broadcast receiving unit as a main-screen or sub-screen to the monitor other than the given monitor being displaying the program list.

4. The digital broadcast receiver according to claim 3, wherein the manipulation input unit is further configured to accept a user's selection of the broadcast receiving unit utilized for receiving a program image, and the program selection instructing unit is further configured to control the broadcast receiving unit selected through the manipulation input unit to receive the program image in the situation that the instruction for selecting a program to be displayed as a main-screen or a sub-screen on the monitor other than the given monitor being displaying the program list is accepted.

* * * * *